A. KENNEDY.
SLICING APPARATUS.
APPLICATION FILED NOV. 12, 1914.

1,149,525.

Patented Aug. 10, 1915.
4 SHEETS—SHEET 1.

A. KENNEDY.
SLICING APPARATUS.
APPLICATION FILED NOV. 12, 1914.
1,149,525.
Patented Aug. 10, 1915.
4 SHEETS—SHEET 2.
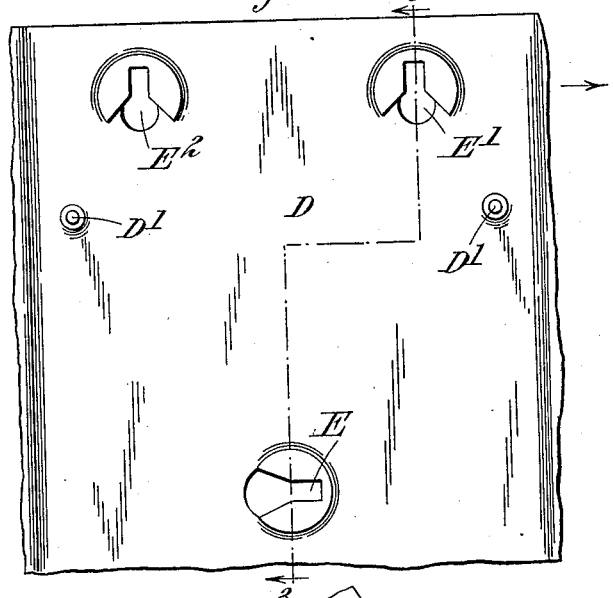
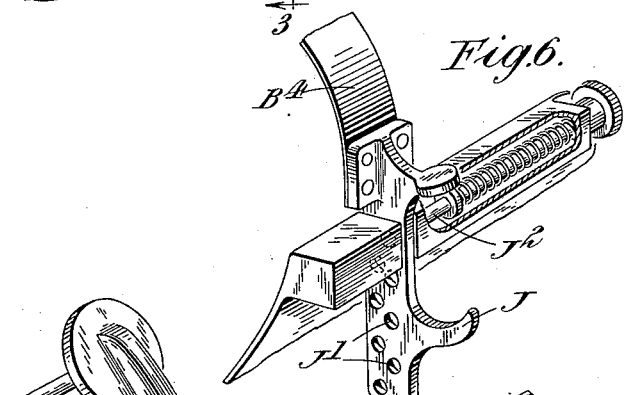
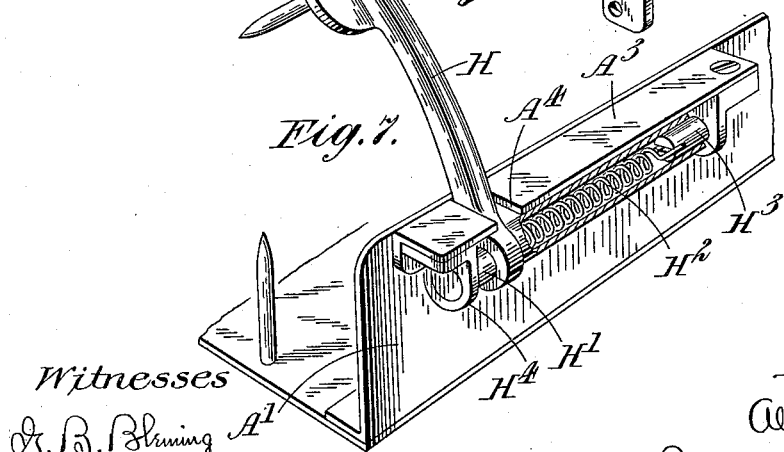
Witnesses
Inventor
Alexander Kennedy,
by Bakewell, Byrnes & Parmelee
Attys.

A. KENNEDY.
SLICING APPARATUS.
APPLICATION FILED NOV. 12, 1914.
1,149,525.
Patented Aug. 10, 1915.
4 SHEETS—SHEET 3.
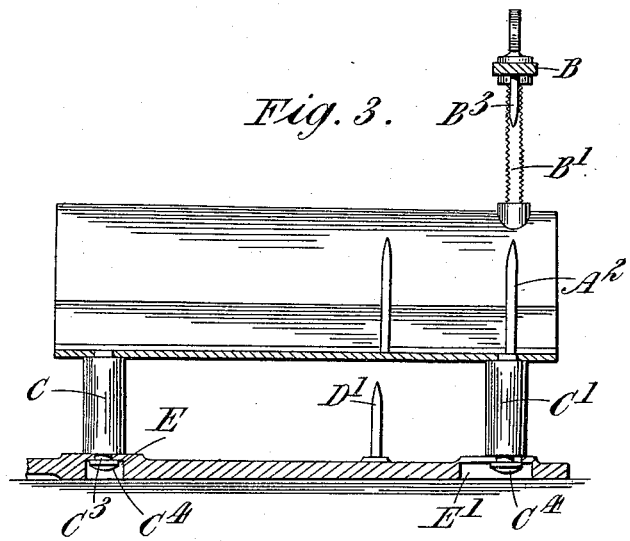
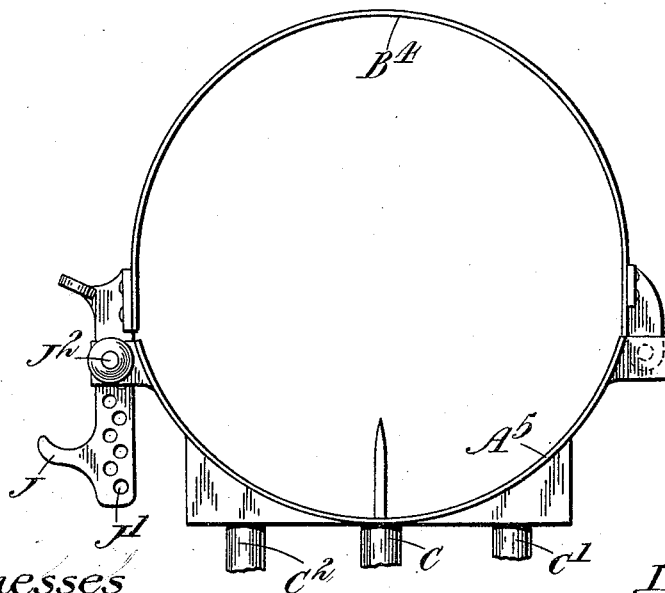

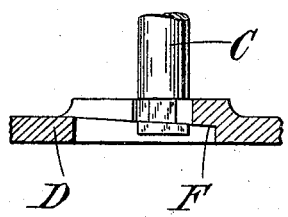
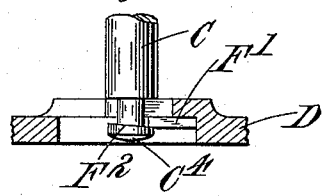
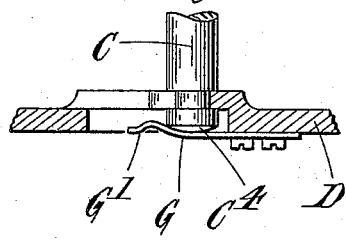
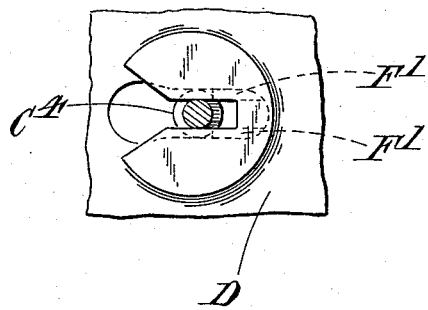
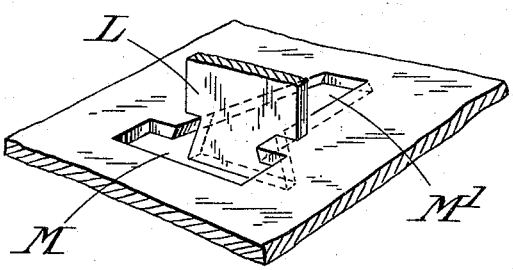

UNITED STATES PATENT OFFICE.

ALEXANDER KENNEDY, OF PECKHAM, LONDON, ENGLAND.

SLICING APPARATUS.

1,149,525.  Specification of Letters Patent.  Patented Aug. 10, 1915.

Application filed November 12, 1914. Serial No. 871,698.

*To all whom it may concern:*

Be it known that I, ALEXANDER KENNEDY, a subject of the King of England, residing at Peckham, London, England, have invented certain new and useful Improvements in Slicing Apparatus, of which the following is a specification.

This invention relates to slicing apparatus and in particular to machines intended for slicing cooked meats.

According to the present invention I provide for the food to be sliced a tray having means to secure the food thereon and with one or more interlocking devices for detachably securing it to a support.

According to one feature of this invention I so combine a tray for food to be sliced with the means in a food-slicing machine whereby the food is fed forward for a fresh cut, that the support is readily detachable from the said feeding means; means to hold the food on to the support may or may not be carried by the support. The means to provide engagement between the said support and a member comprised in the feeding means of the machine conveniently takes the form of three projections on the one and three key-hole slots or their equivalent on the other so disposed that the length of two of the slots are in a direction transverse to that of the length of the third, that one of the said directions is transverse to the line of cut and the other transverse to the line of feed, substantially as and for the purpose described.

Various constructions falling within the scope of the present invention are illustrated in the accompanying drawings, in which—

Figure 1:
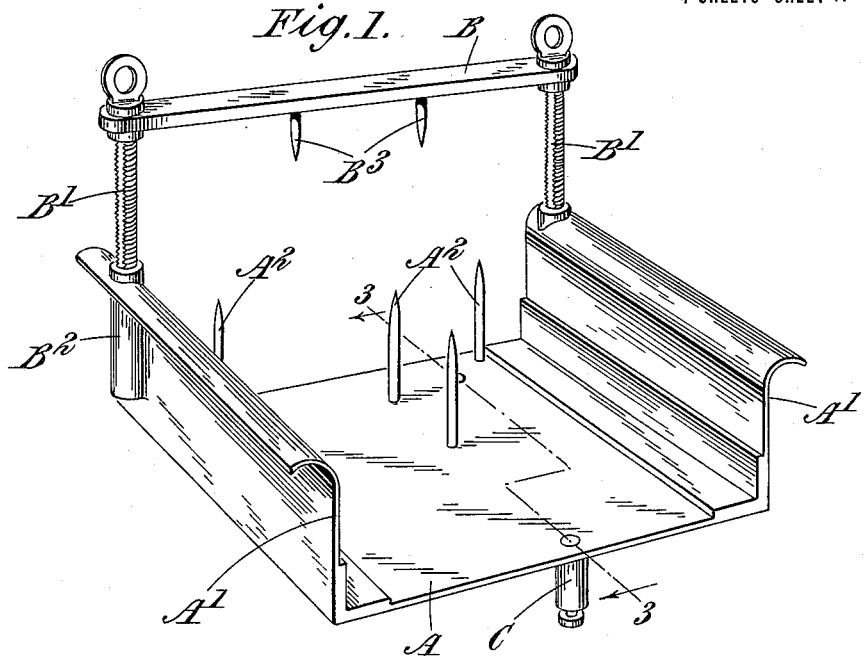
Figure 4:
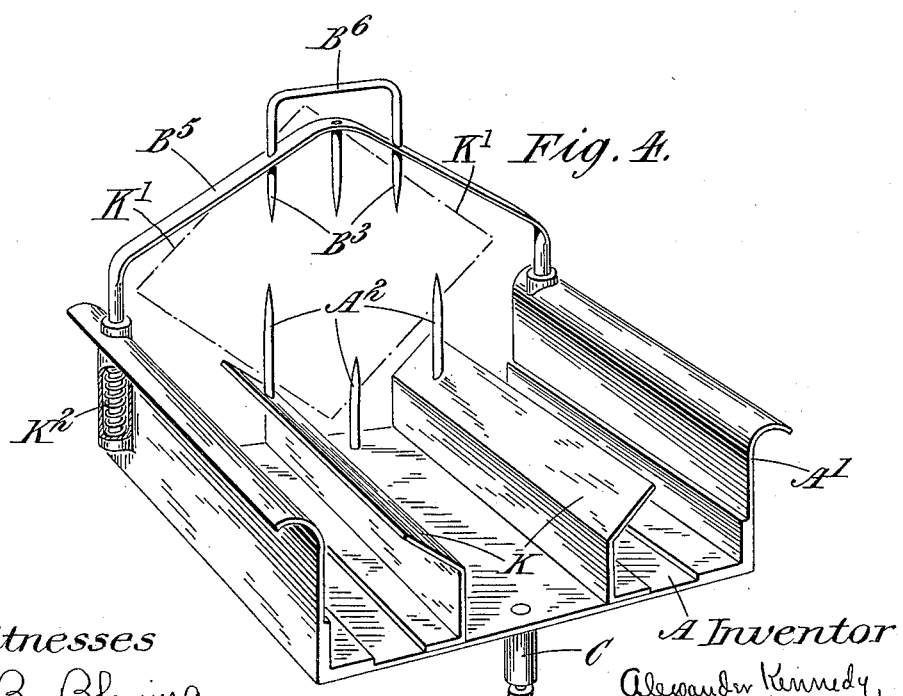

Figure 1 is a perspective view of one construction of food support and grip carried by the support; Fig. 2 is a plan view of a member forming part of a slicing machine to which the support shown in Fig. 1 is to be attached; Fig. 3 is a longitudinal section on the lines 3.3 of Figs. 1 and 2 showing the parts represented in these figures assembled together; Fig. 4 is a perspective view of an alternative construction of support; Fig. 5 shows another modification; Fig. 6 is a perspective view of a detail of a portion of Fig. 5; Fig. 7 is a perspective view of another modification; and Figs. 8, 9, 10, 11 and 12 illustrate alternative constructions of a detail.

Like reference characters indicate like parts in all the figures of the drawings.

A tray is prepared provided with sides $A^1$ and with an adjustable strap B carried upon pins $B^1$ adapted to slide in guides $B^2$ supported upon the sides $A^1$ of the tray. Each pin $B^1$ is in the form of a screw-threaded rod upon which two parallel flats have been filed and the guides $B^2$ are screw-threaded at their upper extremities but have portions of the screw-threading cut away after the manner of a breech-lock screw so that the pins $B^1$ can slide freely up and down in one position but are securely held if rotated through one-quarter of a turn. On the under side of the tray are three feet of which two only, C, $C^1$, are visible in the drawings. At the bottom of each foot is formed a neck $C^3$ leaving a head $C^4$.

At D is shown the feed table of an automatic slicing machine of the well-known type having a rotatory circular knife. In the feed table are formed three key-hole slots E, $E^1$, $E^2$ to coöperate with the three feet C, $C^1$, $C^2$ respectively to provide means for detachably securing the tray to the table. The two slots $E^1$, $E^2$ have their lengths disposed transversely to the direction of cut while the other slot E has its length disposed transversely to the direction of feed; the large end of the slot E is made somewhat larger than the corresponding portions of the slots $E^1$, $E^2$ to facilitate bringing the parts together. The three slots and the three legs are so disposed that when the heads $C^4$ have been introduced initially into the large ends of the slots the tray is moved relatively to the table about the foot in the slot $E^2$ as a pivot, the inclined edge of the slot E serving to drive the feet in both the slots $E^1$, $E^2$ forward into their proper positions. The direction in which the table is moved for the cut is indicated by the arrow in Fig. 2; it will thus be seen that the thrust set up between the knife and the material in the tray tends to force the foot that is in the slot E more securely home rather than to loosen it. In order, however, to provide for firm engagement between the tray and table I may arrange beneath each slot a wedge-like surface F, as seen in Fig. 9, or blocks $F^1$, as seen in Figs. 10 and 11, to coöperate with an inclined surface $F^2$ on the head $C^4$ of a foot so that movement of the latter toward the small end of the slot produces a wedging action to hold the tray and table firmly engaged. Further, in order to provide against accidental disengagement due to the inertia of the tray and its load when the motion of the food table is reversed I may provide a snap-lock as seen in Fig. 8 in the form of a plate-spring G provided with a hump $G^1$ and secured to the underside of the table just beneath the slot in the position shown. The foot C experiences no resistance on first insertion but as it is moved to the right in Fig. 8 it can only do so by deflecting the spring and so is snapped into position and held there, as will be readily understood. Each foot C, $C^1$, $C^2$ is made sufficiently long to carry the tray clear of the spikes $D^1$ which are usually provided to prevent the food from shifting. The tray itself is provided with spikes $A^2$ and the strap B with spikes $B^3$ for a similar purpose.

In place of the adjustable strap B I may employ a pivoted arm H as seen in Fig. 7. This arm is carried upon a tubular sleeve $H^1$ within which is a spring $H^2$ in compression but also under continual stress and held twisted between a pin $H^3$ and the said sleeve. Upon the side $A^1$ of the tray is a ledge $A^3$ slotted at $A^4$ which serves to support the arm against endwise movement when cutting is in progress. When it is desider to take a fresh grip of the food the top of the arm is moved out to the right, as viewed in Fig. 7, and when the other end of the arm clears the slot $A^4$ the compression of the spring $H^2$ causes it to snap forward and be held in the outward position by engagement with the edge of the ledge $A^3$. The sleeve $H^1$ then protrudes through the bracket $H^4$ and if pressure be applied to the protruding end to compress the spring the latter will by its twist, when the arm is in register with the slot $A^4$ return the arm to the position seen in Fig. 7.

In place of a rigid strap B (as seen in Fig. 1) I may make it flexible as seen at $B^4$ in Fig. 5 and may provide it with a tab J pierced with holes $J^1$ to coöperate with a spring-plunger $J^2$, (as seen in Fig. 5) and more clearly in part section in Fig. 6.

In Fig. 5 is seen a construction of tray $A^5$ whose contour is circular; this is intended for use with circular brawns or for cutting seven sausages at a time arranged in the well-known formation of six in circular order about a central one forming the seventh. The tag-securing device J, $J^1$, $J^2$ permits of goods varying considerably in size and shape to be handled in the same tray. The strap $B^4$ may be provided with spikes or not.

In Fig. 4 is shown a construction of tray intended for carrying loaves of rectangular section such as are employed for sandwiches. Upon the tray are guides K upon which the loaf rests so as to be presented to the knife in the manner indicated in chain line at $K^1$. Three spikes $A^2$ are provided upon the tray and the strap takes the form seen at $B^5$ supported by the sides $A^1$ of the tray and held down by tension springs of which one is seen at $K^2$. A great advantage arising from this construction is that the loaf is presented cornerwise to the knife with the result that the crust is not torn from the crumb, as frequently occurs when a flat side is presented to the knife first. Further the guiding effect of the shaped supports K insures that when the strap $B^5$ is lifted and the loaf moved forward for a fresh feed the cut face is kept approximately parallel with its former position, thus avoiding waste of bread. At the top of the strap $B^5$ is a wire handle $B^6$ to enable it to be raised to free the loaf and the ends of the handle are prolonged to form spikes $B^3$.

In Fig. 12 is seen in perspective a construction which gives the function of that shown in Figs. 9, 10 and 11 and which is an alternative to these. One of the two parts to be secured together is provided with a T-shaped slot M, $M^1$ and the other with a wedge shaped foot L. The foot is inserted into the large portion or head M of the slot and is then moved into the tapering stem portion $M^1$. The parts are so arranged that the action of cutting the material tends to force the parts so that the foot L enters farther into the stem $M^1$ and thus causes the two parts to be wedged securely together.

It is to be understood that other constructions than those described in detail and illustrated fall within the scope of this invention, thus the term "tray" is to be taken as indicating a support for the food but not necessarily one with sides nor one that is in any sense trough-like; it may be a plain flat slab. The interlocking devices between the "tray" and its support may be variously constructed but are intended to be such as permit of quick and easy attachment and detachment and the scope of this invention does not extend to the employment of an ordinary screw-clamp as means for attaching the tray to its support; a prominent advantage of the present invention is that it provides interchangeability of the trays and enables one slicing machine to be used for a variety of foods carried on a corresponding number of trays, with a small expenditure of time in changing one for another. The time expended in screwing or unscrewing nuts or screws is impracticable for the main purpose of this invention and devices depending upon such operation for their successful application do not fall within its scope nor come within the category of the term "interlocking devices" as herein employed. On the other hand in the place of the key-hole slots E, $E^1$, $E^2$ the equivalent of these may be employed and fall within the scope of this invention; such a device, for example as a parallel-sided slot arranged so as at one end to engage with a groove on a pin moved within the slot is regarded as equivalent to a key-hole slot as is any arrangement of slot and pin in which engagement is due to relative motion between the pin and the part in which is the slot.

It is to be understood that in so far as the tray forms a ready and convenient means for holding food while it is being sliced it falls within the scope of this invention without reference to the precise character of the object to which it is secured in a readily detachable manner.

It is to be understood that I do not claim for holding the parts firmly yet removably in place, the use of pins or their equivalent in conjunction with yielding retaining means nor the use of a pin and socket arrangement coöperating with resilient retaining means other than the specific construction in which resilient retaining means provided by the spring G, G¹ are applied to one of three simultaneously coöperating interlocking devices. But:—

What I claim as my invention and desire to secure by Letters Patent is:—

1. In apparatus for slicing food, a tray member to receive food, a supporting member for the tray, means carried by the tray to secure the food thereon, and interlocking pin and slot connections for securing the tray to the support, the connections being so constructed and arranged that relative movement between the said two members for their engagement and disengagement occurs in a plane that is transverse to the plane in which the food is to be sliced; substantially as described.

2. In apparatus for slicing food, the combination of a tray member to receive food, a feed table of a slicing machine constituting a support for the tray, devices carried by the tray to secure the food thereon, and interlocking pin and slot connections for securing the tray to the feed table, said connections being so constructed and arranged that relative movement between the said two members for their engagement and disengagement occurs in a plane that is transverse to the plane in which the food is to be sliced; substantially as described.

3. In apparatus for slicing food, a tray member to receive the food, means to secure food upon the tray, a second member in the form of a support for the tray, three projections on one of the said members and three coöperating slots on the other member so disposed that the lengths of two of the slots are in a plane transverse to the plane of the length of the third and that one of the said planes is transverse to the line of cut and the other transverse to the line of feed; substantially as described.

4. In apparatus for slicing food, a tray member to receive the food, means to secure food upon the tray, a supporting member for the tray, three projections on one of the said members, three coöperating slots in the other member, a resiliently controlled retaining device coöperating with one of the slots to engage the coöperating projection, and which slots are so disposed that the lengths of two of the slots are in a plane transverse to the plane of the length of the third and that one of the said planes is transverse to the line of cut and the other transverse to the line of feed; substantially as described.

5. In apparatus for slicing food, a tray member to receive food having flat surfaces to contact with the food and so disposed as to receive and coöperate with two adjacent flat surfaces of a body of food whose cross-section is rectangular, a supporting member for the tray, means carried by the tray to secure the food thereon, and interlocking pin and slot devices for securing the tray to the supporting member, said devices being so constructed and arranged that relative movement between the two members for their engagement and disengagement occurs in a plane that is transverse to the plane in which the food is to be sliced; substantially as described.

6. In apparatus for slicing food, a tray member to receive the food, a supporting member for the tray, a flexible band having one end secured to the tray, means to secure the other end to the tray in such a manner as to vary the effective length of the band, and interlocking pin and slot devices for connecting the tray member to the supporting member, said devices being so constructed and arranged that relative movement between the said two members for their engagement and disengagement occurs in a plane that is transverse to the plane in which the food is to be sliced; substantially as described.

In testimony whereof I have signed my name to this specification in the presence of two subscribing witnesses.

ALEXANDER KENNEDY.

Witnesses:
 HAROLD H. SIMMONS,
 RONALD S. DOLLEYMORE.

Copies of this patent may be obtained for five cents each, by addressing the "Commissioner of Patents, Washington, D. C."